US011218795B2

(12) United States Patent
Leabman et al.

(10) Patent No.: US 11,218,795 B2
(45) Date of Patent: Jan. 4, 2022

(54) SYSTEMS, METHODS, AND DEVICES FOR UTILIZING A WIRE OF A SOUND-PRODUCING DEVICE AS AN ANTENNA FOR RECEIPT OF WIRELESSLY DELIVERED POWER

(71) Applicant: Energous Corporation, San Jose, CA (US)

(72) Inventors: Michael A. Leabman, San Ramon, CA (US); Alister Hosseini, Phoenix, AZ (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 17/103,806

(22) Filed: Nov. 24, 2020

(65) Prior Publication Data
US 2021/0152922 A1    May 20, 2021

Related U.S. Application Data

(63) Continuation of application No. 15/631,992, filed on Jun. 23, 2017, now Pat. No. 10,848,853.

(51) Int. Cl.
*H04R 25/00* (2006.01)
*H04R 1/10* (2006.01)
(Continued)

(52) U.S. Cl.
CPC ........... *H04R 1/1066* (2013.01); *H04B 1/385* (2013.01); *H04B 7/14* (2013.01); *H04B 10/1141* (2013.01);
(Continued)

(58) Field of Classification Search
CPC ........ H02J 7/00; H02J 7/02; H02J 7/34; H02J 7/025; H02J 17/00; H02J 50/12;
(Continued)

(56) References Cited

U.S. PATENT DOCUMENTS 787,412 A    4/1905 Tesla
2,811,624 A    10/1957 Haagensen
(Continued)

FOREIGN PATENT DOCUMENTS

CN    101401312 A    4/2009
CN    201278367 Y    7/2009
(Continued)

OTHER PUBLICATIONS

Energous Corp., IPRP, PCT/US2014/037072, Nov. 10, 2015, 6 pgs.
(Continued)

*Primary Examiner* — Shawkat M Ali
(74) *Attorney, Agent, or Firm* — Morgan, Lewis & Bockius LLP

(57) ABSTRACT

The wireless power receiver includes at least one wire of a sound-producing device. The at least one wire configured for both conveying sound signals or securing at least part of the sound-producing device to a user, and receiving power waves. The wireless power receiver also includes power harvesting circuitry coupled with the at least one wire and a power source of an electronic device, like a battery. The power harvesting circuitry is configured to isolate the received power waves from the conveyed sound signals, convert the received power waves to usable energy, and provide the usable energy to the power source of the electronic device.

20 Claims, 5 Drawing Sheets

(51) Int. Cl.
*H04R 23/00* (2006.01)
*H04B 7/14* (2006.01)
*H04B 1/3827* (2015.01)
*H04B 10/114* (2013.01)
*H04B 10/80* (2013.01)
*H04R 5/033* (2006.01)

(52) U.S. Cl.
CPC ............ *H04B 10/807* (2013.01); *H04R 1/10* (2013.01); *H04R 1/1025* (2013.01); *H04R 23/008* (2013.01); *H04R 25/55* (2013.01); *H04R 25/554* (2013.01); *H04R 5/033* (2013.01); *H04R 2225/31* (2013.01)

(58) Field of Classification Search
CPC .. H02J 50/15; H02J 50/27; H02J 50/40; H02J 50/80; H03J 1/00; H04B 1/385; H04B 1/3827; H04B 7/14; H04B 10/114; H04B 10/1141; H04R 1/10; H04R 1/1066; H04R 23/00; H04R 23/008; H04R 25/00; H04R 25/554; H04R 25/602
USPC ......... 307/104; 320/108; 327/517; 333/17.1; 375/142, 219, 257, 295, 316
See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |

(56) References Cited

U.S. PATENT DOCUMENTS

| | | |
|---|---|---|
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,181,756 B2 | 1/2019 | Bae et al. |
| 10,186,892 B2 | 1/2019 | Hosseini et al. |

(56) References Cited

U.S. PATENT DOCUMENTS

| | | |
|---|---|---|
| 10,193,396 B1 | 1/2019 | Bell et al. |
| 10,199,835 B2 | 2/2019 | Bell |
| 10,199,849 B1 | 2/2019 | Bell |
| 10,205,239 B1 | 2/2019 | Contopanagos et al. |
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,511,097 B2 | 12/2019 | Kornaros et al. |
| 10,516,301 B2 | 12/2019 | Leabman |
| 10,523,058 B2 | 12/2019 | Leabman |
| 10,848,853 B2 | 11/2020 | Leabman et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |

(56) References Cited

U.S. PATENT DOCUMENTS

| | | |
|---|---|---|
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0174604 A1 | 7/2009 | Keskitalo |
| 2009/0180653 A1 | 7/2009 | Sjursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |

(56) References Cited

U.S. PATENT DOCUMENTS

| | | |
|---|---|---|
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1* | 1/2012 | John ............... H02J 50/50 307/104 |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |

(56) References Cited

U.S. PATENT DOCUMENTS

| | | |
|---|---|---|
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0063550 A1 | 3/2013 | Ritchey et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1* | 12/2013 | Bennett ............... H04R 25/554 381/315 |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |

(56) References Cited

U.S. PATENT DOCUMENTS

| | | |
|---|---|---|
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |

(56) References Cited

U.S. PATENT DOCUMENTS

| | | |
|---|---|---|
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0028403 A1 | 1/2016 | McCaughan et al. |
| 2016/0042206 A1 | 2/2016 | Pesavento et al. |
| 2016/0043571 A1 | 2/2016 | Kesler et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0197522 A1 | 7/2016 | Zeine et al. |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110886 A1 | 4/2017 | Reynolds et al. |
| 2017/0110888 A1 | 4/2017 | Leabman |
| 2017/0110889 A1 | 4/2017 | Bell |
| 2017/0110914 A1 | 4/2017 | Bell |
| 2017/0127196 A1* | 5/2017 | Blum .................. H02J 50/12 |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |

(56) References Cited

U.S. PATENT DOCUMENTS

| | | | |
|---|---|---|---|
| 2017/0179771 | A1 | 6/2017 | Leabman |
| 2017/0187198 | A1 | 6/2017 | Leabman |
| 2017/0187222 | A1 | 6/2017 | Hosseini |
| 2017/0187223 | A1 | 6/2017 | Hosseini |
| 2017/0187228 | A1 | 6/2017 | Hosseini |
| 2017/0187248 | A1 | 6/2017 | Leabman |
| 2017/0187422 | A1 | 6/2017 | Hosseini |
| 2017/0214422 | A1 | 7/2017 | Na et al. |
| 2017/0338695 | A1 | 11/2017 | Port |
| 2018/0040929 | A1 | 2/2018 | Chappelle |
| 2018/0048178 | A1 | 2/2018 | Leabman |
| 2018/0090992 | A1 | 3/2018 | Shrivastava et al. |
| 2018/0123400 | A1 | 5/2018 | Leabman |
| 2018/0131238 | A1 | 5/2018 | Leabman |
| 2018/0159338 | A1 | 6/2018 | Leabman et al. |
| 2018/0159355 | A1 | 6/2018 | Leabman |
| 2018/0166924 | A1 | 6/2018 | Hosseini |
| 2018/0166925 | A1 | 6/2018 | Hosseini |
| 2018/0198199 | A1 | 7/2018 | Hosseini |
| 2018/0205232 | A1 | 7/2018 | Leabman et al. |
| 2018/0212454 | A1 | 7/2018 | Leabman |
| 2018/0212474 | A1 | 7/2018 | Hosseini |
| 2018/0226840 | A1 | 8/2018 | Leabman |
| 2018/0241255 | A1 | 8/2018 | Leabman |
| 2018/0248409 | A1 | 8/2018 | Johnston |
| 2018/0254639 | A1 | 9/2018 | Bell |
| 2018/0262014 | A1 | 9/2018 | Bell |
| 2018/0262040 | A1 | 9/2018 | Contopanagos |
| 2018/0262060 | A1 | 9/2018 | Johnston |
| 2018/0269570 | A1 | 9/2018 | Hosseini |
| 2018/0287431 | A1 | 10/2018 | Liu et al. |
| 2018/0309314 | A1 | 10/2018 | White et al. |
| 2018/0331429 | A1 | 11/2018 | Kornaros |
| 2018/0331581 | A1 | 11/2018 | Hosseini |
| 2018/0337534 | A1 | 11/2018 | Bell et al. |
| 2018/0375340 | A1 | 12/2018 | Bell et al. |
| 2018/0375368 | A1 | 12/2018 | Leabman et al. |
| 2019/0052115 | A1 | 2/2019 | Hosseini |
| 2019/0052979 | A1* | 2/2019 | Chen .................... H04R 1/1025 |
| 2019/0074133 | A1 | 3/2019 | Contopanagos |
| 2019/0074728 | A1 | 3/2019 | Leabman |
| 2019/0131827 | A1 | 5/2019 | Johnston |
| 2019/0173323 | A1 | 6/2019 | Hosseini |
| 2019/0245389 | A1 | 8/2019 | Johnston et al. |
| 2019/0288567 | A1 | 9/2019 | Leabman et al. |
| 2019/0372384 | A1 | 12/2019 | Hosseini et al. |
| 2019/0393729 | A1 | 12/2019 | Contopanagos et al. |
| 2019/0393928 | A1 | 12/2019 | Leabman |
| 2020/0006988 | A1 | 1/2020 | Leabman |
| 2020/0021128 | A1 | 1/2020 | Bell et al. |
| 2020/0044488 | A1 | 2/2020 | Johnston et al. |
| 2021/0152922 | A1 | 5/2021 | Leabman et al. |

FOREIGN PATENT DOCUMENTS

| | | |
|---|---|---|
| CN | 102292896 A | 12/2011 |
| CN | 102860037 A | 1/2013 |
| CN | 103348563 A | 10/2013 |
| CN | 103683443 A | 3/2014 |
| CN | 203826555 U | 9/2014 |
| CN | 104090265 A | 10/2014 |
| CN | 104113814 A | 10/2014 |
| CN | 105491472 A | 4/2016 |
| CN | 106329116 A | 1/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2002319816 A | 10/2002 |
| JP | 2006157586 A | 6/2006 |
| JP | 2007043432 A | 2/2007 |
| JP | 2008167017 A | 7/2008 |
| JP | 2011083078 A | 4/2011 |
| JP | 2012095226 A | 5/2012 |
| JP | 2013162624 A | 8/2013 |
| JP | 2015128349 A | 7/2015 |
| JP | 2017034935 A | 2/2017 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140085200 A | 7/2014 |
| KR | 20150077678 A | 7/2015 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.

(56) References Cited

OTHER PUBLICATIONS

Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/039334, Dec. 24, 2019, 8 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.

(56) References Cited

OTHER PUBLICATIONS

Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP16880139.7, dated Jul. 12, 2019, 5 pgs.
Extended European Search Report, EP16880153.8, dated Jul. 2, 2019, 9 pgs.
Extended European Search Report, EP16880158.7, dated Jul. 15, 2019, 8 pgs.
Extended European Search Report, EP16882597.4, dated Aug. 7, 2019, 9 pgs.
Extended European Search Report, EP16882696.4, dated Jul. 3, 2019, 10 pgs.
Extended European Search Report, EP17840412.5, dated Jul. 15, 2019, 8 pgs.
Extended European Search Report, EP17882087.4, dated Sep. 17, 2019, 10 pgs.
Extended European Search Report, EP18204043.6, dated Feb. 14, 2019, 5 pgs.
Extended European Search Report, EP18820206.3, dated May 17, 2021, 6 pgs.
Extended European Search Report, EP19214719.7, dated Jan. 17, 2020, 9 pgs.
Notice of Intent to Issue Reexam Certificate: 90/013793 dated Feb. 2, 2017, 8 pgs.
Order Granting Reexamination Request, U.S. Appl. No. 90/013,793 dated Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Apglied Imagery Pattern Recognition Workshop. 8 pgs.

(56) References Cited

OTHER PUBLICATIONS

Han et al. Enhanced Computer Vision with Microsoft Kinect Sensor: A Review, IEEE Transactions on Cybernetics vol. 43, No. 5. pp. 1318-1334, Oct. 3, 2013.
Hsieh et al. "Development of a Retredirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.
Li et al., High-Efficiency Switching-Mode Charger System Design Corlsiderations with Dynamic Power Path Management, Mar./Apr. 2012 Issue, 8 pgs.
Mao et al. "BeamStar: An Edge-Based Approach to Routing in Wireless Sensors Networks", IEEE Transactions on Mobile Computing, IEEE Service Center, Los Alamitos, CA US, vol.6, No. 11, Nov. 1, 2007, 13 pgs.
Mascarenas et al. "Experimental Studies of Using Wireless Energy Transmission for Powering Embedded Sensor Nodes," Nov. 28, 2009, Journal of Sound and Vibration, 13 pgs.
Mishra et al. "SIW-based Slot Array Antenna and Power Management Circuit for Wireless Energy Harvesting Apglications", IEEE APSURSI, Jul. 2012, 2 pgs.
Nenzi et al "U-Helix: On-Chip Short Conical Antenna", 2013 7th European Conference on Antennas and Progagation (EUCAP), ISBN:978-1-4673-2187-7, IEEE, Apr. 8, 2013, 5 pgs.
Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.
Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.
Van Veen et al., "Beamforming: A Versatile Approach to Spatial Filtering", IEEE, ASSP Magazine, Apr. 1988, pp. 4-24.
Zhai et al. "A Practical Wireless Charging System Based On Ultra-Wideband Retro-Reflective Beamforming" 2010 IEEE Antennas and Propagation Society International Symposium, Toronto, ON 2010, 4 pgs.

\* cited by examiner

SYSTEMS, METHODS, AND DEVICES FOR UTILIZING A WIRE OF A SOUND-PRODUCING DEVICE AS AN ANTENNA FOR RECEIPT OF WIRELESSLY DELIVERED POWER

CROSS-REFERENCE TO RELATED APPLICATIONS

This application is a continuation of U.S. Non-Provisional patent application Ser. No. 15/631,992, filed on Jun. 23, 2017, entitled "Systems, Methods, and Devices for Utilizing a Wire of a Sound-Producing Device as an Antenna for Receipt of Wirelessly Delivered Power," which is hereby incorporated by reference in its entirety

TECHNICAL FIELD

The disclosed embodiments relate generally to antennas in wireless power transmission systems. In particular, the disclosed embodiments relate to repurposing wires found in sound-producing devices as antennas for receipt of wirelessly delivered power (so that these repurposed wires are then operated as antennas, while still performing their originally intended functions, such as conveying electrical signals and/or securing a sound-producing device to a user's ear).

BACKGROUND

Portable electronic devices, such as laptop computers, mobile phones, tablets, and other electronic devices, require frequent charging of a power-storing component (e.g., a battery) to operate. Many electronic devices require charging one or more times per day. Often, charging an electronic device requires manually connecting an electronic device to an outlet or other power source using a wired charging cable. In some cases, a power-storing component, e.g., a battery, is removed from an associated electronic device and inserted into charging equipment to charge. Such charging is inefficient because it often requires users to carry around multiple charging cables and/or other charging devices, and requires users to locate appropriate power sources, e.g., wall outlets, to charge their electronic devices. Additionally, conventional charging techniques potentially deprive a user of the ability to use the device while it is charging, and/or require the user to remain next to a wall outlet or other power source to which their electronic device or other charging equipment is connected.

Building a wireless charging system for consumer devices typically requires adding complicated, and often, expensive antenna components that receive wirelessly delivered power in the consumer devices. Many of these consumer devices are also small, compact, and/or do not contain enough space for added antenna components. As such, it would be desirable to provide a wireless charging system that addresses the above-mentioned drawbacks.

SUMMARY

Accordingly, there is a need for methods, apparatuses, and systems for wirelessly charging electronic devices, and for building such systems in a cost-effective fashion. As such, repurposing existing components of electronic devices and/or sound-producing devices (e.g., wires from headphones, hearing aids, or earpieces) in accordance with some of the embodiments described herein helps to lower costs while building more effective wireless charging systems. In some cases, utilizing existing components lowers costs for wireless power receivers, enables development of smaller and more compact wireless power receivers, and is more convenient to users. Many ear-interface devices (also referred to herein as sound-producing devices, sound-conveying devices, and sound-generating devices), examples of which include but are not limited to, headphones, hearing aids, and earpieces have conductive wires in their structure. These existing conductive wires may be used as receiving antennas for various wireless applications, such as wireless communications (e.g., Wi-Fi, Bluetooth, and GSM) and wireless charging (e.g., far-range, medium-range, and near-field charging systems). As one example, a method of wirelessly charging an electronic device (e.g., a mobile phone) may include repurposing one or more wires of a sound-producing device (e.g., one of the wires of a part of headphones) coupled to the electronic device to receive power waves, and energy from those power waves is then harvested and converted by power conversion circuitry into usable electricity for powering or charging the electronic device.

In some embodiments, the existing wires are connected to the power-conversion circuitry (or other circuitry or integrated circuit suitable for the particular application, such as receiving Wi-Fi, Bluetooth, or GSM signals) through a matching network (e.g., an impedance matching network configured to minimize signal reflection) and optionally an isolating filter or circuitry. For example, if the existing wire is not purposed for conveying signals for the sound-producing device, then an isolating filter may not be needed. As another example, if the existing wire is purposed for conveying electrical signals to be converted to sound by a speaker, then an isolating filter may be utilized to isolate received power waves (or other types of signals, depending on the type of signal being received) from the electrical signals intended for the speaker.

Existing wires or conductors in sound-producing devices may have many different lengths. However, with an appropriate matching network based on the desired frequency, these wires can be tuned to receive signals and/or power at one or more desired frequencies, in accordance with some embodiments described in more detail below. For example, in headphones having two earpieces coupled to a volume/microphone control, a dipole antenna forms from the wire(s) connecting the two earpieces to a volume/microphone control component of the headphones. In some embodiments, a matching circuit and/or power conversion circuitry (that may also include the matching circuit) is located inside of the volume/microphone control component.

Some embodiments of the invention relate to a wireless power receiver. The wireless power receiver includes at least one wire of a sound-producing device (e.g., a headphone, hearing aid, earpiece, or cochlear or other implant) and power harvesting circuitry. The at least one wire is configured to convey sound signals or to secure at least part of the sound-producing device to a user. The at least one wire is also purposed to perform an additional function (in addition to its originally intended functions), such as performing the additional function of receiving power waves used for powering the sound-producing device. The power harvesting circuitry is coupled to the at least one wire and a power source of an electronic device, e.g., a rechargeable battery. The power harvesting circuitry is configured to convert the received power waves to usable energy, and provide the usable energy to the power source of the electronic device. This allows the same wire to be reused for power receipt (while still performing its originally intended functions), thereby reducing the need for additional antenna, reducing cost, while maintaining the size of the device.

In some embodiments, the at least one wire comprises an external wire of the sound-producing device. In some embodiments, the at least one wire includes a conductive shield adapted to receive power waves, and wherein the power harvesting circuitry is configured to receive the power waves via the conductive shield. In some embodiments, the sound-producing device further comprises a speaker coupled to the at least one wire, where the at least one wire is configured to transmit the electrical signals to the speaker for conversion to sound. In some embodiments, the sound-producing device is a headphone; an earbud; a pair of headphones; a pair of earbuds; one or more earpieces; or a hearing aid. In some embodiments, the electronic device is a mobile phone; a tablet computer; a laptop computer; a handheld electronic device; or a portable electronic device. In some embodiments, the sound-producing device is coupled to the electronic device via a headphone jack. In some embodiments, the power harvesting circuitry is configured to convert energy from two or more types of power waves. In some embodiments, the power harvesting circuitry includes a rectifier and a power converter. In some embodiments, the power harvesting circuitry is a component of an integrated wireless power receiving circuit. In some embodiments, the integrated wireless power receiving circuit includes a controller configured to manage power conversion by the integrated wireless power receiving circuit. In some embodiments, the integrated wireless power receiving circuit includes a matching circuit adapted to match a frequency for the at least one wire. In some embodiments, the integrated wireless power receiving circuit is configured to isolate the power waves from other electrical signals travelling along the at least one wire.

Some embodiments provide a method of utilizing at least one wire of a sound-producing device as an antenna for receipt of wirelessly delivered power. The at least one wire is coupled to power harvesting circuitry that is in turn coupled to a power source of an electronic device distinct from the sound-producing device. Initially, the at least one wire is used during operation the sound-producing device. The at least one wire also receives power waves. The power harvesting circuitry then converts the power waves (or energy extracted therefrom) to usable electricity, which is provided to the power source of the electronic device. For example, the at least one wire is coupled with a speaker of the sound-producing device, and using the at least one wire in operation comprises transmitting via the at least one wire electrical signals to the speaker for conversion to sound.

In some embodiments, the power waves are radio frequency signals that are transmitted so that they constructively interfere in proximity to the sound-producing device. In some embodiments the one or more power waves have a frequency of 915 MHz, 2.4 GHz, or 5.8 GHz. In some embodiments, the power waves are received from a far-field power transmitter. In some embodiments, the power waves are received from a near-field power transmitter. In some embodiments, receiving the power waves comprises utilizing the at least one wire as a monopole antenna. In some embodiments, the at least one wire comprises two wires, and receiving the one or more power waves comprises utilizing the two wires as a dipole antenna. In some embodiments, using the at least one wire in operation of the sound-producing device comprises utilizing the at least one wire to secure the sound-producing device to a user's ear.

Some embodiments provide a sound-producing device configured to receive wirelessly delivered power. The sound producing device includes a speaker, power-harvesting circuitry, at least one wire coupled to the speaker and the power-harvesting circuitry. The at least one wire is configured to convey electrical signals to the speaker for conversion to audible sound, and operate as an antenna to receive power waves. The sound producing device also includes a power source coupled to the at least one power harvesting circuitry and configured to provide power to the sound-producing device sound. The power harvesting circuitry is configured to isolate the received power waves from the electrical signals, convert the isolated power waves to usable electricity, and provide the usable electricity to the power source.

In some embodiments, the at least one wire is further configured to secure the sound-producing device to a user's ear. In some embodiments, the power harvesting circuitry is configured to convert energy from two or more types of power waves. In some embodiments, the power harvesting circuitry includes a rectifier and a power converter.

In another aspect, some embodiments include a wireless power receiver with the means for performing the methods described herein. In another aspect, some embodiments include a wireless power transmission system with the means for performing the methods described herein.

Thus, devices, circuits, and systems are provided with methods for wirelessly conveying power (and/or data) to electronic devices by repurposing one or more wires of sound-producing devices to function as receiving antennas; thereby increasing the effectiveness, efficiency, and user satisfaction with such systems and devices. Such methods may complement or replace conventional methods for conveying power to electronic devices.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
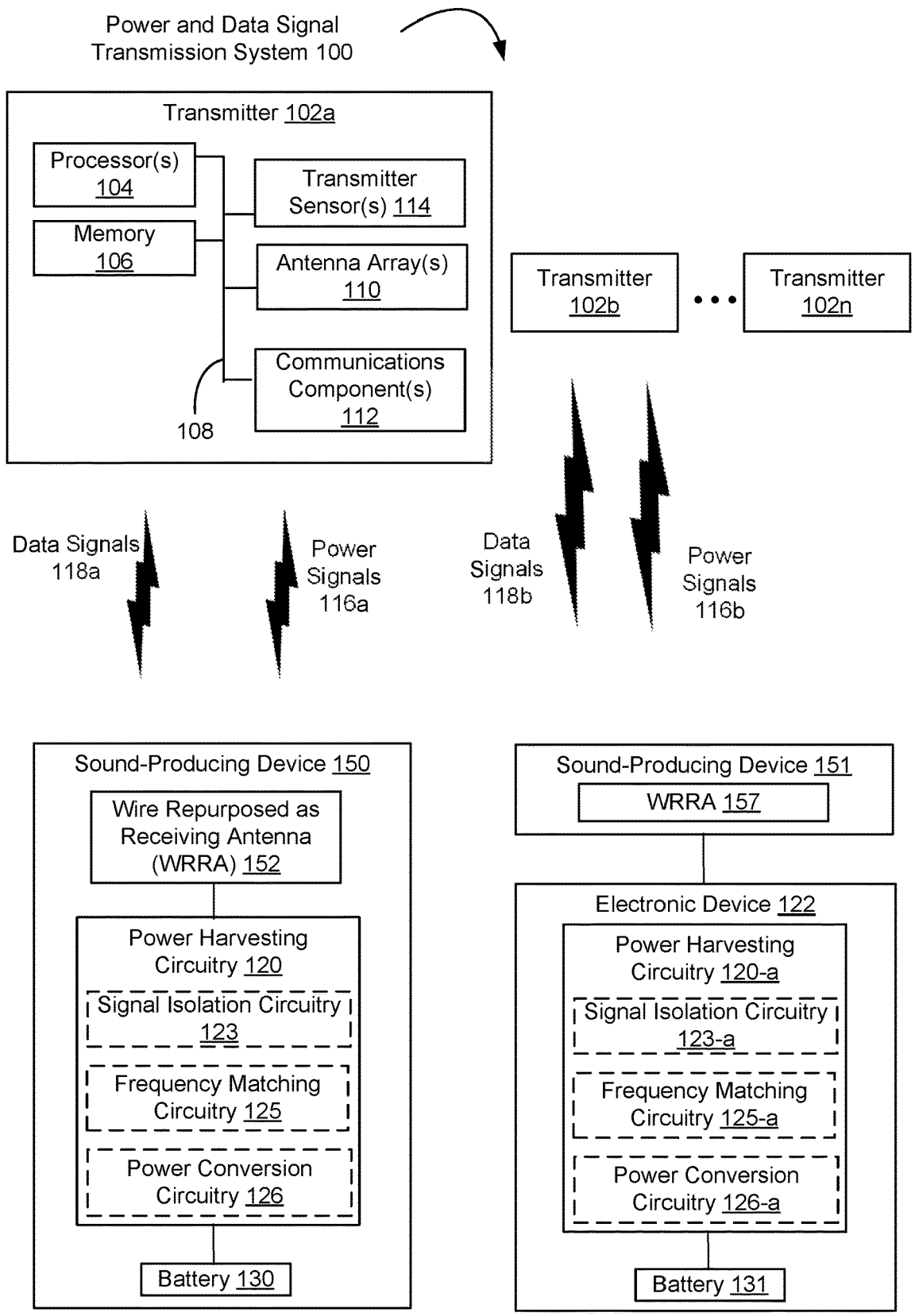
FIG. 1 is a block diagram illustrating representative components of a wireless power transmission system in accordance with some embodiments.

In accordance with common practice, the various features illustrated in the drawings may not be drawn to scale. Accordingly, the dimensions of the various features may be

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

For the sake of brevity, the following detailed description describes embodiments directed at electronic devices that include a wire for transmitting a signal (e.g., an audio signal in a hearing-aid device), where the wire is repurposed to also harvest energy from power waves (also referred to interchangeably herein as power signals, power waves, or power transmission waves). Repurposing an existing wire to serve the additional power harvesting function eliminates the need for a separate antenna for receiving power waves. As used herein, "repurposing" of the wire means using the wire for an additional purpose, i.e., in addition to its intended purpose (e.g., its intended purpose of transmitting signals for the sound-producing device).

FIG. 1 illustrates components of an example wireless power transmission system 100, in accordance with some embodiments. Wireless power transmission system 100 includes, e.g., transmitters 102 (e.g., transmitters 102a, 102b . . . 102n) and devices that are configured to receive wireless power. The devices that are configured to receive wireless power may include a sound-producing device 150 (e.g., a hearing-aid or a headset or headphone) with a wire 152 (with an existing function for the sound-producing device 150) that is repurposed to also operate as a receiving antenna and power harvesting circuitry 120 that is used to process signals (e.g., received RF power waves) received via the repurposed wire 152. The devices that are configured to receive wireless power also optionally include a sound-producing device 151 coupled to an electronic device 122, the sound-producing device 151 having a wire 157 that is repurposed to operate as a receiving antenna. In some embodiments, the sound-producing device 151 is coupled with an electronic device 122 that includes power harvesting circuitry 120-a used to process power waves received via the repurposed wire 157. In some embodiments, the power harvesting circuitry 120 (or components thereof) is included in the sound-producing device 151, while in other embodiments, components of the power harvesting circuitry 120 are split between the sound-producing device 151 and the electronic device 122. In some embodiments, the wireless power transmission system 100 includes a number of devices that include respective power harvesting circuitry 120. In some embodiments, a wireless power receiver includes a device that is able to receive wireless power, such as a sound-producing device 150 that includes power harvesting circuitry 120, or a sound-producing device 151 that is coupled with a separate electronic device 122 (each of which may include components of power harvesting circuitry in 120-a, 120-b).

An example transmitter 102 (e.g., transmitter 102a) includes, e.g., one or more processor(s) 104, a memory 106, one or more antenna arrays 110 (preferably multiple antennas), one or more communications components 112, and/or one or more transmitter sensors 114. In some embodiments, these components are, interconnected via a communications bus 108. References to these components of transmitters 102 cover embodiments in which one or more than one of each of these components (and combinations thereof) are included.

In some embodiments, memory 106 stores one or more programs (e.g., sets of instructions) and/or data structures, collectively referred to as "modules" herein. In some embodiments, memory 106, or the non-transitory computer readable storage medium of memory 106 stores the following programs, modules, and data structures, or a subset or superset thereof:

- information received from a device having power harvesting circuitry 120 (e.g., received via communication signals 118a);
- information received from transmitter sensor 114;
- an adaptive pocket-forming module that adjusts one or more power waves transmitted by one or more transmitters 102; and/or
- a beacon transmitting module that transmits a communication signal 118 for detecting and/or communicating with devices having power harvesting circuitry 120 (e.g., devices located within a transmission field of the one or more transmitters 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, memory 106 stores a subset of the modules identified above. In some embodiments, an external mapping memory (not shown) that is communicatively connected to each of the transmitters 102 (or to a communications component thereof, such as communications component 112 of transmitter 102a) stores one or more modules identified above. Furthermore, the memory 106 and/or external mapping memory may store additional modules not described above. In some embodiments, the modules stored in memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to memory 106 is implemented on memory of a server (not shown) that is communicatively coupled to one or more transmitters 102 and/or by a memory of electronic device 122 and/or memory associated with a power harvesting circuitry 120.

In some embodiments, a single processor 104 (e.g., processor 104 of transmitter 102a) executes software modules for controlling multiple transmitters 102 (e.g., transmitters 102b . . . 102n). In some embodiments, a single transmitter 102 (e.g., transmitter 102a) includes multiple processors 104, such as one or more transmitter processors (configured to, e.g., control transmission of waves 116 by antenna array 110), one or more communications component processors (configured to, e.g., control communications transmitted by communications component 112 and/or receive communications via communications component 112) and/or one or more sensor processors (configured to, e.g., control operation of transmitter sensor 114 and/or receive output from transmitter sensor 114).

Power harvesting circuitry 120 (e.g., power harvesting circuitry 120-a associated with an electronic device 122 or power harvesting circuitry 120 coupled with a sound-producing device 150) receives power waves 116 and/or communications 118 (e.g., 118a and 118b) transmitted by transmitters 102. In some embodiments, the power harvesting circuitry 120 includes one or more antennas including at least one antenna composed of a repurposed wire of a sound-producing device (e.g., the wire 157 repurposed as a receiving antenna of sound-producing device 151), and optionally one or more receiver sensors. In some embodiments, the power harvesting circuitry 120 includes one or more of: power conversion circuitry 126 (also referred to interchangeably herein as a power converter 126), signal isolation circuitry 123, and frequency matching circuitry 125. In some embodiments, various components of a power harvesting circuitry 120 are located within two or more distinct devices (e.g., some components are located with a sound-producing device 151 and other components are located within an electronic device 122). References to these components of power harvesting circuitry 120 cover embodiments in which one or more than one of each of these components (and combinations thereof) are included. Power harvesting circuitry 120 converts energy from received waves 116 (e.g., power waves) into electrical energy to power and/or charge an electronic device (e.g., electronic device 122 or sound-producing device 150). For example, power conversion circuitry 126 is used to convert captured energy from power waves 116 to alternating current (AC) electricity or direct current (DC) electricity usable to power and/or charge an electronic device. Non-limiting examples of power conversion circuitry 126 include rectifiers, rectifying circuits, voltage conditioners, among suitable circuitry and devices.

In some embodiments, the optional frequency matching circuitry 125 comprises a fixed wideband matching circuit that tunes the performance and/or matching of a particular repurposed wire (e.g., 152 or 157) antenna for limited orientation/applications (for example far-field and near-field applications). In some embodiments, the matching circuitry 125 comprises an adaptive matching chip and/or reconfigurable matching circuit (for example using a varactor) that tunes the matching for wider sets of applications and orientations (e.g., in real-time). In some embodiments, such circuits are connected to a feedback loop monitoring the received power (e.g., the feedback loop is formed between one or more transmitters 102 and the receiver over a wireless channel, e.g. BLUETOOTH or BLUETOOTH Low Energy (BLE), in order to control power transfer efficiency. In some embodiments, the one or more transmitters and the receiver exchange data over the feedback loop to tune transmitter (e.g., to tune characteristics used to transmit power waves to the receiver) and receiver (e.g., if power received by the receiver is less than a threshold level, the adaptive/reconfigurable circuitry changes until the received power reaches the threshold level).

In some embodiments, after the power waves 116 are received and/or energy is harvested from a concentration or pocket of energy, circuitry (e.g., integrated circuits, amplifiers, rectifiers, and/or voltage conditioner) of the power harvesting circuitry 120 converts the energy of the power waves (e.g., radio frequency electromagnetic radiation) to usable power (e.g., electricity), which directly powers electronic device 122 or sound-producing device 150 and/or is stored to battery 130 or battery 131. In some embodiments, a rectifying circuit of the power conversion circuitry 126 translates the electrical energy from AC to DC for use by electronic device 122. In some embodiments, a voltage conditioning circuit included with the power conversion circuitry 126 increases or decreases the voltage of the electrical energy as required by the battery 130 or 131. In some embodiments, an electrical relay of the power conversion circuitry 126 is used to convey electrical energy to the battery 130 or 131.

In some embodiments, power harvesting circuitry 120 is a component of a sound-producing device (that may or may not be coupled to an electronic device), the signal processing circuitry is a component of the electronic device (e.g., power harvesting circuitry 120-a is a component of electronic device 122), or the power harvesting circuitry 120 may be split between an electronic device and a sound-producing device. In some embodiments, electronic device 122 obtains power from multiple transmitters 102 (in other embodiments, each transmitter may be assigned to transmit wireless power to a particular electronic device or sound-producing device with repurposed wire antenna). In some embodiments, the wireless power transmission system 100 includes a plurality of electronic devices 122 and sound-producing devices 150 (and may also include electronic devices coupled with sound-producing devices 151), each having at least one respective power harvesting circuitry 120 that is used to harvest power waves from the transmitters 102 into usable power for charging the electronic devices 122.

In some embodiments, one or more transmitters generate power waves to form pockets of energy at target locations and adjust power wave generation based on sensed data to provide safe, reliable, and efficient wirelessly-delivered power to receivers (and devices associated therewith). In some embodiments, a controlled "pocket of energy" (e.g., a region in which available power is high or concentrated due to constructive interference of power waves) and/or null spaces (e.g., a region in which available power is low or nonexistent due to destructive interference of power waves) may be formed by convergence of the power waves transmitted into a transmission field of the one or more transmitters. In some embodiments, pockets of energy form at one or more locations in a two- or three-dimensional field due to patterns of constructive interference caused by convergences of transmitted power waves. Energy from the transmitted power waves may be harvested by receivers (i.e., received and converted into usable power) at the one or more locations.

In some instances, constructive interference of power waves occurs when two or more power waves 116 are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In some instances, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge.

In some embodiments, adaptive pocket-forming is performed, e.g., by adjusting power wave transmission to achieve a target power level for at least some of the power waves transmitted by the one or more transmitters. For example, a system for adaptive pocket-forming includes a sensor. In some embodiments, when the sensor detects an object, such as a sensitive object (e.g., a person, an animal, equipment sensitive to the power waves, and the like) within a predetermined distance (e.g., a distance within a range of 1-5 feet) of a pocket of energy, of one or more of the power waves, or of a transmitter, then a respective transmitter of the one or more transmitters adjusts one or more characteristics of transmitted power waves. Non-limiting examples of the one or more characteristics include: frequency, amplitude, trajectory, phase, and other characteristics used by one or more antennas of the one or more transmitters to transmit the power waves. As one example, in response to receiving information indicating that transmission of power waves by a respective transmitter of the one or more transmitters should be adjusted (e.g., a sensor senses a sensitive object within a predetermined distance of a respective target location), the adaptive pocket-forming process adjusts the one or more characteristics accordingly.

In some embodiments, adjusting the one or more characteristics includes reducing a currently generated power level at a location by adjusting one or more transmitted power waves that converge at the target location. In some embodiments, reducing a currently generated power level includes transmitting a power wave that causes destructive interference with at least one other transmitted power wave. For example, a power wave is transmitted with a first phase that is shifted relative to a second phase of at least one other power wave to destructively interfere with the at least one other power wave in order to diminish or eliminate the currently generated power level at the target location.

In some embodiments, adjusting the one or more characteristics includes increasing a power level for some of the transmitted power waves to ensure that the receiver (e.g., with power harvesting circuitry 120) receives adequate energy sufficient to quickly charge a power-storing component of an electronic device that is associated with the receiver.

In some embodiments, an object is "tagged" (e.g., an identifier of the object is stored in memory in association with a flag) to indicate that the detected object is a sensitive object. In response to detection of a particular object within a predetermined distance of a target location, a determination is made as to whether the particular object is a sensitive object. In some embodiments, this determination includes performing a lookup in the memory to check whether the particular object has been previously tagged and is therefore known as a sensitive object. In response to determining that the particular object is a sensitive object, the one or more characteristics use to transmit the power waves are adjusted accordingly.

In some embodiments, sensing a sensitive object includes using a series of sensor readings from one or more sensors to determine motion of an object within a transmission field of the one or more transmitters. In some embodiments, sensor output from one or more sensors is used to detect motion of the object approaching within a predetermined distance of a pocket of energy or of power waves used to form the pocket of energy. In response to a determination that a sensitive object is approaching (e.g., moving toward and/or within a predefined distance of a pocket of energy), the currently generated power level at the location of the pocket of energy is reduced. In some embodiments, the one or more sensors include sensors that are internal to the one or more transmitters, the receiver, and/or sensors that are external to the one or more transmitters and the receiver and may include thermal imaging, optical, radar, and other types of sensors capable to detecting objects within a transmission field.

Although some embodiments herein include the use of RF-based wave transmission technologies as a primary example, it should be appreciated that the wireless charging techniques that might be employed are not be limited to RF-based technologies and transmission techniques. Rather, it should be appreciated that additional or alternative wireless charging techniques may be utilized, including any suitable technology and technique for wirelessly transmitting energy so that a receiver is capable of converting the transmitted energy to electrical power. Such technologies or techniques may transmit various forms of wirelessly transmitted energy including the following non-limiting examples: ultrasound, microwave, laser light, infrared, or other forms of electromagnetic energy.

In some embodiments, the one or more transmitters 102 adjust one or more characteristics (e.g., phase, gain, direction, and/or frequency) of power waves 116. For example, a transmitter 102 (e.g., transmitter 102a) selects a subset of one or more antenna elements of antenna array 110 to initiate transmission of power waves 116, cease transmission of power waves 116, and/or adjust one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit and/or waveform generator, may control the behavior of the antennas. For example, based on the information received from the receiver via the communications signal 118, a controller circuit may determine a set of one or more characteristics or waveform characteristics (e.g., amplitude, frequency, trajectory, phase, among other characteristics) used for transmitting the power waves 116 that would effectively provide power to the power harvesting circuitry 120 and electronic device 122. The controller circuit may also identify a subset of antennas from the antenna arrays 110 that would be effective in transmitting the power waves 116. As another example, a waveform generator circuit of the respective transmitter 102 coupled to the processor 104 may convert energy and generate the power waves 116 having the waveform characteristics identified by the controller, and then provide the power waves to the antenna arrays 110 for transmission.

In some embodiments, the one or more transmitters 102 transmit power waves 116 that create two or more discrete transmission fields (e.g., overlapping and/or non-overlapping discrete transmission fields). In some embodiments, a first transmission field is managed by a first processor 104 of a first transmitter (e.g. transmitter 102a) and a second transmission field is managed by a second processor 104 of a second transmitter (e.g., transmitter 102b). In some embodiments, the two or more discrete transmission fields (e.g., overlapping and/or non-overlapping) are managed by the transmitter processors 104 as a single transmission field.

In some embodiments, communications component 112 transmits communication signals 118 via a wired and/or wireless communication connection to power harvesting circuitry 120. In some embodiments, communications component 112 generates communications signals 118 used for triangulation of power harvesting circuitry 120. In some embodiments, communication signals 118 are used to convey information between transmitter 102 and power harvesting circuitry 120 (e.g., for adjusting one or more characteristics used to transmit the power waves 116). In some embodiments, communications signals 118 include information related to status, efficiency, user data, power consumption, billing, geo-location, and other types of information.

In some embodiments, communications component 112 (e.g., communications component 112 of transmitter 102a) includes a communications component antenna for communicating with power harvesting circuitry 120 and/or other transmitters 102 (e.g., transmitters 102b through 102n). In some embodiments, these communications signals 118 represent a distinct channel of signals transmitted by transmitter 102, independent from a channel of signals used for transmission of the power waves 116.

In some embodiments, the power harvesting circuitry 120 includes a receiver-side communications component (not shown) configured to communicate various types of data with one or more of the transmitters 102, through a respective communications signal 118 generated by the receiver-side communications component. The data may include location indicators for the power harvesting circuitry 120 or a device associated therewith (e.g., sound-producing device 150, sound-producing device 151, and/or electronic device 122); a power status of the power harvesting circuitry 120 or a device associated therewith (e.g., sound-producing device 150, sound-producing device 151, and/or electronic device 122); status information for the power harvesting circuitry 120 or a device associated therewith (e.g., sound-producing device 150, sound-producing device 151, and/or electronic device 122); status information for the power harvesting circuitry 120 or a device associated therewith (e.g., sound-producing device 150, sound-producing device 151, and/or electronic device 122); status information about transmission or reception of the power waves 116; and/or status information for pockets of energy. In other words, the power harvesting circuitry 120 may provide data to the transmitter 102, via the communications signal 118, regarding the current operation of the power transmission system 100, including: information identifying a present location of the power harvesting circuitry 120 or a device associated therewith (e.g., sound-producing device 150, sound-producing device 151, and/or electronic device 122), an amount of energy received by the power harvesting circuitry 120, and an amount of power received and/or used by a device associated with the power harvesting circuitry 120 (e.g., sound-producing device 150, sound-producing device 151, and/or electronic device 122), among other possible data points containing other types of information. In some embodiments, communications signals 118 sent by the power harvesting circuitry 120 or a device associated therewith may include data for, e.g., alerting transmitters 102 that the power harvesting circuitry 120 or a device associated therewith has entered or is about to enter a transmission field, indicate the effectiveness of received power waves 116, and/or provide updated characteristics or transmission parameters that the one or more transmitters 102 may use to adjust transmission of the power waves 116.

In some embodiments, the wire of a particular sound-producing device (e.g., 150 or 151) may also be repurposed (while continuing to perform its original function, such as conveying sound data or signals in a headphone or performing a securing function for a hearing aid) to function as a receiving or transmitting antenna for the communication and control signals 118 discussed above. For example, the wire 152 or 157 may be repurposed to send and/or receive data packets between power harvesting circuitry 120 and the transmitters 102.

In some embodiments, transmitter sensor 114 and/or receiver sensor (which may be a component of the power harvesting circuitry 120) detect and/or identify conditions of electronic device 122, sound-producing devices 150 or 151, power harvesting circuitry 120, transmitter 102, and/or a transmission field. In some embodiments, data generated by transmitter sensor 114 and/or receiver sensor is used by transmitter 102 to determine appropriate adjustments to the one or more characteristics used to transmit the power waves 116. Data from transmitter sensor 114 and/or receiver sensor received by transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the power harvesting circuitry 120 and the transmitters 102 is also used (such as thermal imaging data, information from optical sensors, and others).

In some embodiments, the receiver sensors include a gyroscope that provides raw data such as orientation data (e.g., tri-axial orientation data), and processing this raw data may include determining a location of power harvesting circuitry 120 and/or a device associated therewith using the orientation data. The receiver sensors may also include one or more infrared sensors (e.g., that output thermal imaging information), and processing this infrared sensor data includes identifying a person (e.g., indicating presence of the person and/or indicating an identification of the person) or other sensitive object based upon the thermal imaging information. In some embodiments, the receiver sensors may further or alternatively include an accelerometer that provides orientation data for power harvesting circuitry 120 and/or a device associated therewith (the received orientation information may be used to determine whether electronic device 122 and/or sound-producing devices 150 or 151 are lying flat on a table, in motion, and/or in use).

Non-limiting examples of transmitter sensor 114 and/or receiver sensors include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for transmitter sensor 114 and/or receiver sensors include binary sensors that acquire stereoscopic sensor data, such as the location of a human or other sensitive object.

In some embodiments, transmitter sensor 114 and/or a receiver sensor is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, transmitters 102 adjust one or more characteristics used to transmit the power waves 116 to ensure compliance with electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for maximum permissible exposure (MPE), and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In some embodiments, output from transmitter sensor 114 and/or a receiver sensor is used by transmitter 102 to detect whether a person or other sensitive object enters a power transmission region (e.g., a location within a predetermined distance of a transmitter 102, power waves generated by transmitter 102, and/or a pocket of energy). In some embodiments, in response to detecting that a person or other sensitive object has entered the power transmission region, the transmitter 102 adjusts one or more power waves 116 (e.g., by ceasing power wave transmission, reducing power wave transmission, and/or adjusting the one or more characteristics of the power waves). In some embodiments, in response to detecting that a person or other sensitive object has entered the power transmission region, the transmitter 102 activates an alarm (e.g., by transmitting a signal to a loudspeaker that is a component of transmitter 102 or to an alarm device that is remote from transmitter 102). In some embodiments, in response to detecting that a person or other sensitive object has entered a power transmission region, the transmitter 102 transmits a digital message to a system log or administrative computing device.

In some embodiments, antenna array 110 includes multiple antenna elements (e.g., configurable "tiles") collectively forming an antenna array. Antenna array 110 generates, e.g., RF power waves, ultrasonic power waves, infrared power waves, and/or magnetic resonance power waves. In some embodiments, the antennas of an antenna array 110 (e.g., of a single transmitter, such as transmitter 102a, and/or of multiple transmitters, such as transmitters 102a, 102b, . . . , 102n) transmit two or more power waves that intersect at a defined location (e.g., a location corresponding to a detected location of a power harvesting circuitry 120), thereby forming a pocket of energy at the defined location.

In some embodiments, transmitter 102 assigns a first task to a first subset of antenna elements of antenna array 110, a second task to a second subset of antenna elements of antenna array 110, and so on, such that the constituent antennas of antenna array 110 perform different tasks (e.g., determining locations of previously undetected power harvesting circuitries 120 and/or transmitting power waves 116 to one or more power harvesting circuitries 120). As one example, in an antenna array 110 with ten antennas, nine antennas transmit power waves 116 that form a pocket of energy and the tenth antenna operates in conjunction with communications component 112 to identify new receivers in the transmission field. In another example, an antenna array 110 having ten antenna elements is split into two groups of five antenna elements, each of which transmits power waves 116 to two different power harvesting circuitries 120 in the transmission field.

Figure 2A:
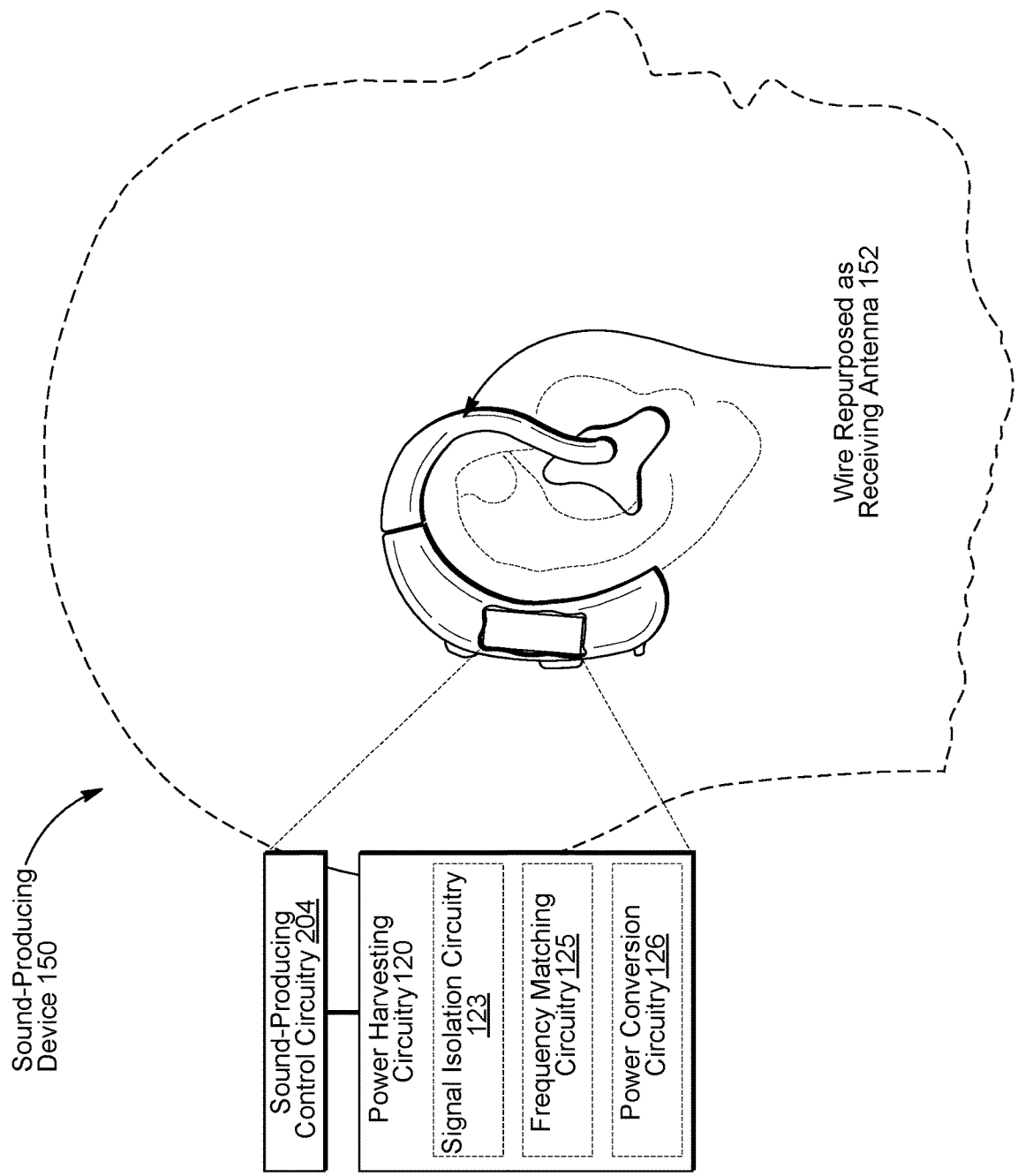
FIGS. 2A-2B are block diagrams illustrating representative sound-producing devices that include wires that have been repurposed to function as receiving antennas in accordance with some embodiments.
Figure 2B:
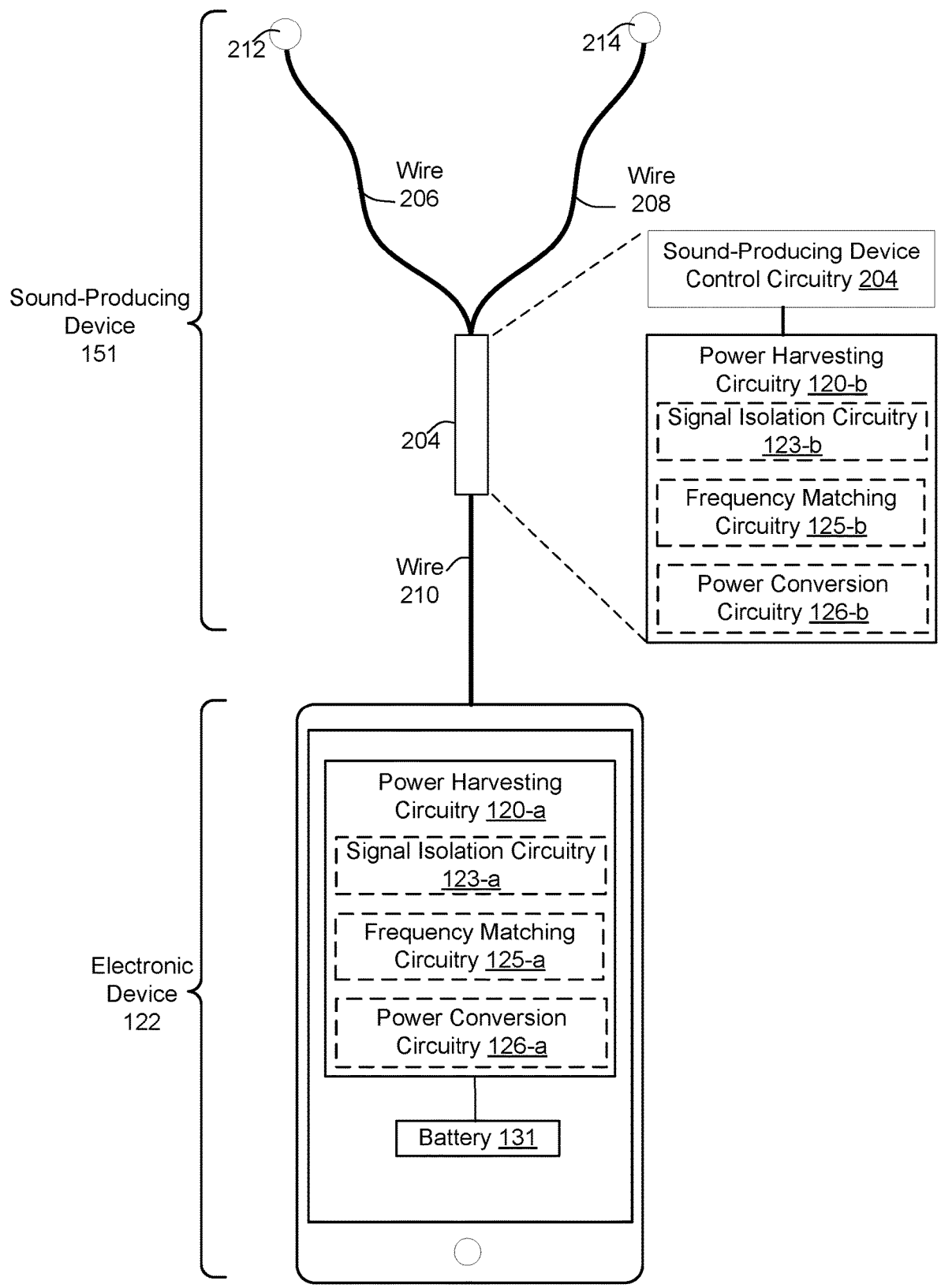

Turning now to FIGS. 2A-2B, block diagrams illustrating example sound-producing devices are shown. These example sound-producing devices include wires that have been repurposed to function as receiving antennas in accordance with some embodiments. FIG. 2A shows a representative sound-producing device 150 (e.g., a hearing aid) having sound-producing device control circuitry 204 (e.g., for controlling signals conveyed by sound-producing device 150), power harvesting circuitry 120, and a wire 152. In accordance with some embodiments, the power harvesting circuitry 120 optionally includes signal isolation circuitry 123 configured to isolate signals received via an antenna composed of repurposed wire 152 from signals conveyed by the sound-producing device 150, frequency matching circuitry 125 configured to match frequencies of signals received via repurposed wire 152, and/or power conversion circuitry 126 configured to convert power received via repurposed wire 152 to usable energy for directly powering sound-producing device 150 and/or for charging a battery associated with sound-producing device 150 (e.g., battery 130, FIG. 1).

In some embodiments, the wire 152 is adapted to convey signals of the sound-producing device (e.g., to convey audio signals received and amplified by sound-producing device 150 to a speaker in the user's ear). In some embodiments, power conversion circuitry 126 includes a rectifier and/or a power converter, as discussed above in reference to FIG. 1. In some embodiments, power conversion circuitry 126 harvests power received via wire 152 and converts the power to usable energy for sound-producing device 150.

In some embodiments, the wire 152 is a wire that is used to help secure the sound-producing device 150 to a user's ear, and is not used to convey audio signals. In this way, some embodiments are able to repurpose wires that are not currently used to convey electrical signals to then function as receiving antennas for, e.g., receipt of wireless power. In some embodiments, the power harvesting circuitry 120 is coupled to a conductive shielding of the wire 152 and configured to harvest energy from power waves received via the conductive shielding.

As is also shown in FIG. 2A, the sound-producing control circuitry 204 is coupled to the power harvesting circuitry 120. This coupling allows the signal isolation circuitry 123 to provide isolated audio data and signals (i.e., isolated from power waves or signals derived therefrom that may be traveling along a same repurposed wire 152) to the sound-producing circuitry 204, as is described in more detail in reference to FIGS. 3A-3B.

FIG. 2B shows a representative sound-producing device 151 (e.g., headphones) coupled to electronic device 122 via wire(s) 210 and having sound-producing device control circuitry 204, power harvesting circuitry 120-b, earpieces 212 and 214, and wires 206 and 206 coupling earpieces 212 and 214 to sound-producing device control circuitry 204. In some embodiments, the wires 206 and 208 physically and communicatively couple earpieces 212 and 214 to the sound-producing device control circuitry 204. In some embodiments, and as discussed above in reference to FIG. 1, portions of power harvesting circuitry 120 may be included in either or both of the sound-producing device 151 and the electronic device 122. In this example, the sound-producing device 151 is shown as including power harvesting circuitry 120-*b* with optional components and electronic device 122 is shown as including power harvesting circuitry 120-*a* with optional components.

FIG. 2B also shows that the power harvesting circuitries 120-*a* and 120-*b* each may optionally include signal isolation circuitry 123-*a*, 123-*b* configured to isolate signals received via an antenna composed of a repurposed wire(s) (e.g., wires 206, 208, and 210 may be used as the wire 157 shown in FIG. 1) from signals conveyed by the sound-producing device 151, frequency matching circuitry 125-*a*, 125-*b* configured to match frequencies of signals received via repurposed wire 157, and/or power conversion circuitry 126-*a*, 126-*b* configured to convert power received via repurposed wire 157 to usable energy (e.g., for powering electronic device 122 or charging a battery 131 associated therewith). For example, the isolation circuitry 123-*a*, 123-*b* separates signals to be converted to sound by earpiece(s) 212 and 214 from power waves received at wire(s) 206 and 208. In some embodiments, the power harvesting circuitry 120-*b* is coupled to a conductive shielding of wire(s) 206, 208, and/or 210 and configured to harvest energy from power waves received via the conductive shielding. In some embodiments, the power harvesting circuitry 120-*a* and/or 120-*b* is coupled to a one or more of wire(s) 206, 208, and 210 and configured to harvest energy from power waves received via those wires.

Although in FIG. 2B signal processing circuitry 204 is shown within sound-producing device control circuitry 204, in some embodiments power harvesting circuitry 120-*b* is located at a different location within sound-producing device 151 and/or the components of the signal processing circuitry are split between the sound-producing device 151 and the electronic device 122. For example, in accordance with some embodiments, power harvesting circuitry 120-*a* includes the power conversion circuitry 126-*a* and is coupled with an audio connector of electronic device 122 (e.g., a headphone jack) and with a battery 131 of the device 122, and the power harvesting circuitry 120-*b* includes the signal isolation circuitry 123-*b* and the frequency matching circuitry 125-*b*. In this way, the system is able to isolate and perform the matching functions within the sound-producing device 151, and to perform the power conversion functions closer to where the battery is located within the electronic device 122 (in some embodiments, this also helps to reduce extra power loss due to redirecting the power and also gives the designer more control to limit the power leakage).

In some embodiments, earpiece 212 and/or 214 includes a speaker and one or more of wire(s) 206 and 208 are adapted to transmit signals to the speaker(s). In some embodiments, earpiece 212 and/or 214 includes a microphone and one or more of the wire(s) 206 and 208 is adapted to transmit signals from the microphone. In some embodiments, sound-producing device control circuitry 204 includes an audio chipset, volume control circuitry, microphone control circuitry, and/or speaker control circuitry.

In some embodiments, sound-producing device 151 is coupled to electronic device 122 via an audio port or audio connector (e.g., a headphone jack). In some embodiments, the sound-producing device 151 is coupled to the electronic device 122 via an audio port composed of wire(s) 210.

In some embodiments, one or more of wires 206, 208, and 210 are shielded with a conductive shielding (e.g., a metal shielding). In some embodiments, one or more of wires 206, 208, and 210 are shielded with an insulating shielding (e.g., a rubber or plastic shielding). In various embodiments, one or more of wires 206, 208, and 210 (or conductive shielding of the wires) is utilized as an antenna (e.g., repurposed wire 157, FIG. 1) for a wireless power receiver (e.g., with power harvesting circuitry 120, FIG. 1). In some embodiments, multiple wires of sound-producing device 151 are used (e.g., concurrently used) as antennas. For example, wire 206 is used to receive power waves of a first frequency (e.g., 915 MHz) and one or more of wire(s) 210 are used to receive waves of a second frequency (e.g., 2.4 GHz). In some embodiments, a wire (e.g., wire 206) is used to receive waves of multiple frequencies (e.g., 915 MHz and 2.4 GHz).

In some embodiments, the wires 206 and 208 may be operated as a dipole antenna (i.e., the repurposed wire 157 antenna includes the wires 206 and 208 operating as a dipole antenna). In these embodiments, the control circuitry 204 (which may be a volume control unit on a pair of headphones) functions as a dipole excitation point, and the power harvesting circuitry 120-*b* is used to send usable power back to an associated electronic device (e.g., device 122). For example, at 900 MHz, a far-field gain of 2.82 dBi can be observed from a standard two-wire headphone when these two wires form a dipole antenna in accordance with one example implementation.

In some embodiments, the wire 210 may be operated as a monopole antenna in reference to the PCB ground (i.e., the repurposed wire 157 antenna includes the wire 210 operating as a monopole antenna). In these embodiments, the headphone jack on an associated device (e.g., headphone jack of the device 122) functions as a monopole excitation point, and the power harvesting circuitry 120-*a* is used to send usable power back to an associated electronic device (e.g., device 122). As an example, a far-field gain of 2.2 dBi at 900 MHz can be achieved when this wire is used to from a monopole antenna in accordance with one example implementation.

Figure 3A:
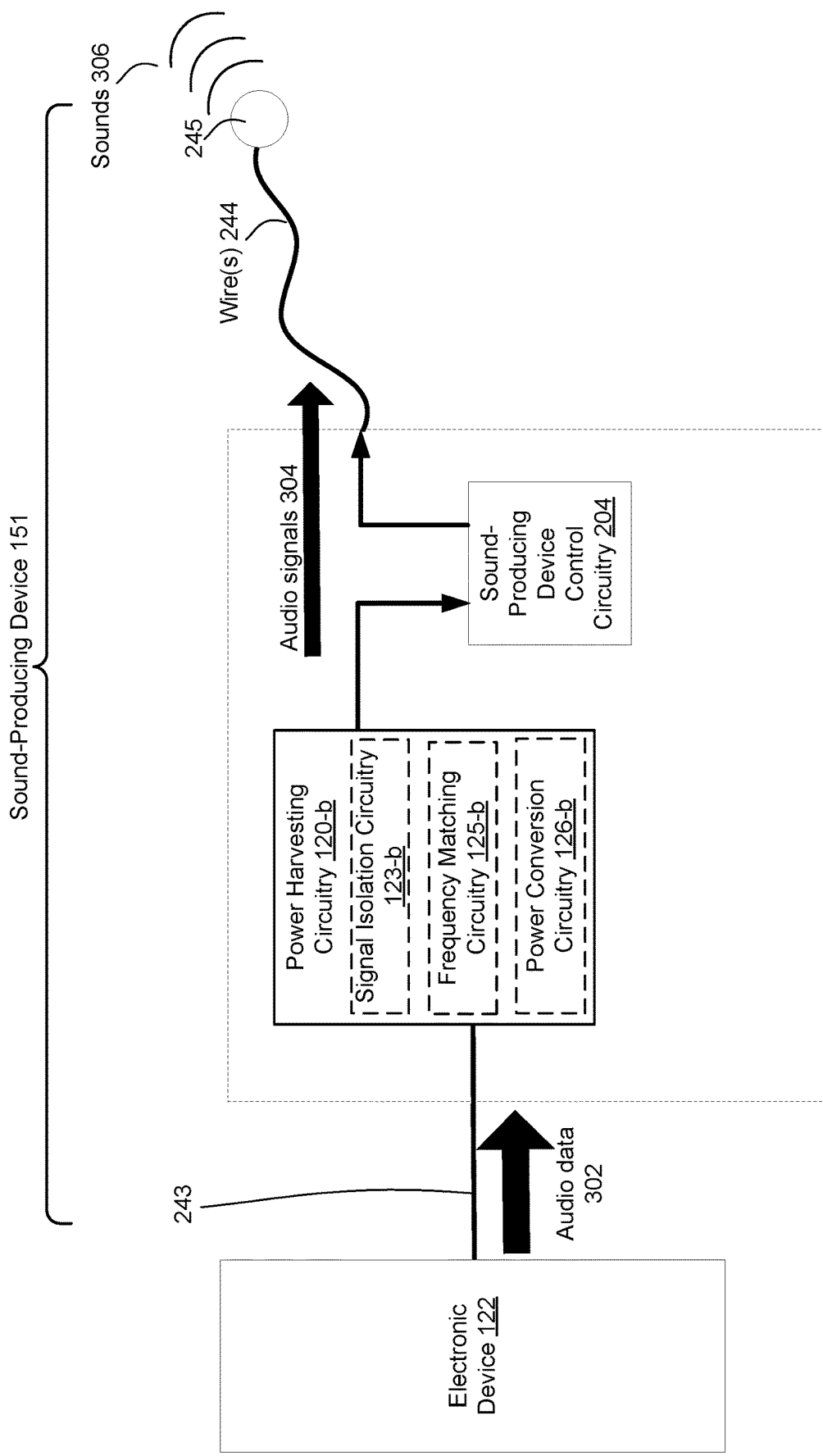
FIGS. 3A-3B are block diagrams illustrating operation of the representative sound-producing device of FIG. 2B in accordance with some embodiments.
Figure 3B:
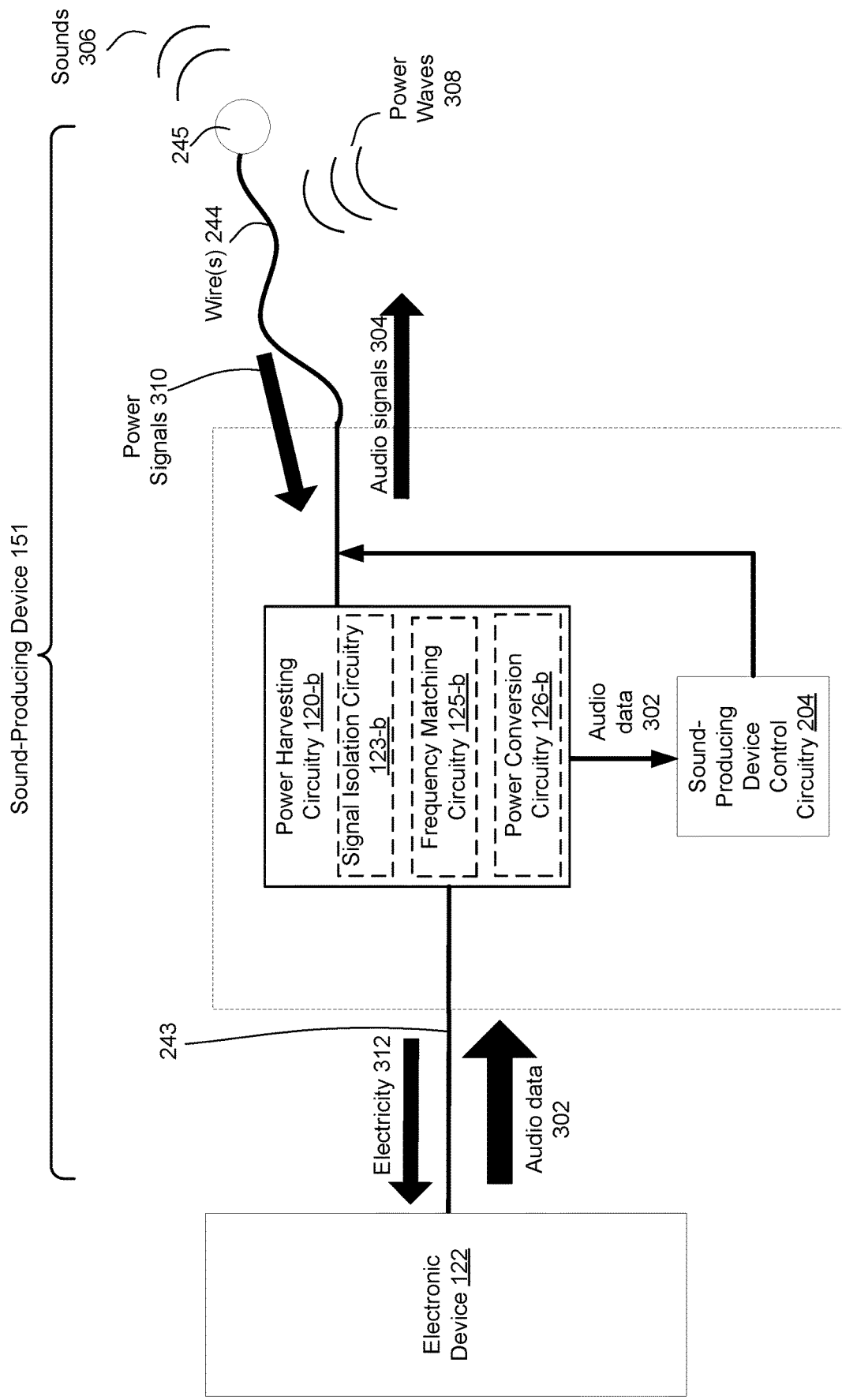

FIGS. 3A-3B are block diagrams illustrating prophetic operation of the representative sound-producing device of FIG. 2B in accordance with embodiments. FIG. 3A shows the sound-producing device 151 receiving audio data 302 (e.g., digital and/or analog audio data) from electronic device 122. FIG. 3A also shows that the audio data may be isolated (using, e.g., signal isolation circuitry 123-*b*) from other signals traveling along a same wire (e.g., one of the repurposed wires discussed herein), and then the sound-producing device 151 generates audio signals 304 (e.g., via sound-producing device control circuitry 204) corresponding to audio data 302 and conveying the audio signals 304 through repurposed wire(s) 244 to earpiece 245. FIG. 3A also shows the earpiece 245 generating sounds 306 corresponding to the audio signals 304. The wire 244 is shown for example purposes and may correspond to any of the wires 206, 208, and 210 shown in FIG. 2B (and combinations thereof, depending on how the repurposed wire 157 antenna is designed to operate).

FIG. 3B shows the sound-producing device 151 continuing to receive audio data 302 and generate corresponding sounds 306. FIG. 3B also shows reception of power waves 308 (e.g., power waves 116, FIG. 1) at repurposed wire(s) 244 and corresponding power signals 310 conveyed from wire(s) 244 to power harvesting circuitry 120-*b*. FIG. 3B also shows transmission of electricity 312 corresponding to the power signals 310 transmitted from sound-producing device 151 to the electronic device 122. In some embodiments (not shown), sound-producing device 151 receives power waves 308 and transmits corresponding electricity 312 to electronic device 122 when sound-producing device 151 is not receiving audio data 302 and/or is not generating corresponding sounds 306. In some embodiments (not shown), sound-producing device 151 receives communication waves and transmits corresponding communication signals to electronic device 122.

In some embodiments, the wire 243 is used to convey electricity 312 to a power source (e.g., battery) of the device 122, so that the power source may be charged using the electricity 312. In some embodiments, the wire 243 conveys both electricity and audio data.

In light of the principles described above with reference to the figures, we now turn to certain example embodiments.

In one aspect, some embodiments include a method of re-purposing at least one wire of a sound-producing device (e.g., wire 152 of sound-producing device 150, FIG. 2A) as an antenna for receipt of wirelessly delivered power. The method includes: (1) coupling the at least one wire of the sound-producing device (e.g., wire 152, FIG. 2A, or wires 206 and 208 operated as a repurposed wire 157 antenna) with power conversion circuitry (e.g., power conversion circuitry 126, FIG. 2A), where the power conversion circuitry is coupled to a power source of an electronic device (e.g., battery 131 of electronic device 122, FIG. 1) distinct from the sound-producing device; (2) receiving, by the at least one wire, one or more power waves (e.g., power waves 308, FIG. 3B); (3) converting, by the power conversion circuitry, energy from the one or more power waves to usable electricity; and (4) providing the usable electricity to the power source of the electronic device (e.g., via wire(s) 210, FIG. 2B). For example, in accordance with some embodiments, wires 206 and 208 in FIG. 2B (operating as wire 157, FIG. 1) both receive one or more power waves, power harvesting circuitry (e.g., 120, 120-a, and/or 120-b) converts the power waves to usable electricity, and wire(s) 210 provide the usable electricity to electronic device 122. In some embodiments, the power source is of the sound-producing device and the usable electricity is provided to that power source (e.g., to battery 130 of the sound-producing device 150, FIG. 1)

In some embodiments, the at least one wire is coupled with a speaker of the sound-producing device; and the method further includes: (1) transmitting electrical signals to the speaker via the at least one wire; and (2) converting, by the speaker, the electrical signals to sound. For example, the wires 206, 208 (operating as wire 157) in FIG. 2B is coupled with earpiece 212 and, in accordance with some embodiments, these wires convey electrical signals to the earpiece 212, 214 and the earpieces convert the electrical signals to sound for a user. In some embodiments, the transmitting is concurrent with the receiving.

In some embodiments, the one or more power waves (e.g., power waves 308, FIG. 3B) comprise radio frequency signals. In some embodiments, the one or more power waves have a frequency of 915 MHz, 2.4 GHz, and/or 5.8 GHz. In some embodiments, the power waves are received from a far-field power transmitter. In some embodiments, the power waves are received from a near-field power transmitter.

In some embodiments, receiving, by the at least one wire, the one or more power waves comprises utilizing the at least one wire as a monopole antenna. For example, in accordance with some embodiments, the wire 152 in FIG. 2A (or the wire 210 is FIG. 2B) is utilized as a monopole antenna to receive power waves (e.g., power waves 116, FIG. 1). In some embodiments, the at least one wire includes two wires. In some embodiments, receiving the one or more power waves comprises utilizing the two wires as a dipole antenna. For example, in accordance with some embodiments, the wires 206 and 208 in FIG. 2B are utilized as a dipole antenna to receive power waves (e.g., power waves 116, FIG. 1).

In some embodiments, the at least one wire includes a wire adapted to secure the sound-producing device to a user. For example, in accordance with some embodiments, the wire 152 in FIG. 2A is utilized to secure sound-producing device 150 to a user's ear. In these embodiments, the repurposed wire 152 was not previously used to convey electrical signals and is now being repurposed to also function as a receiving antenna for receiving wireless power and/or data signals.

In another aspect, a wireless power receiver (e.g., a sound-producing device 150 that includes power harvesting circuitry 120 or a sound-producing device 151 that is coupled with a device 122 (each of which may include components of power harvesting circuitry in 120-a, 120-b), FIG. 1) includes: (1) at least one wire (e.g., wire 244, FIG. 3A) of a sound-producing device (e.g., sound-producing device 151, FIG. 3A), where the at least one wire is used by the wireless power receiver to receive power waves (e.g., power waves 308, FIG. 3B); and (2) power harvesting circuitry (e.g., power harvesting circuitry 120), or power conversion circuitry (e.g., power conversion circuitry 126), coupled with (i) the at least one wire and (ii) a power source of an electronic device (e.g., electronic device 122, FIG. 3A) distinct from the sound-producing device, the power conversion circuitry configured to: (a) convert energy from the received power waves to usable electricity; and (b) provide the usable electricity to the power source of the electronic device (e.g., via wire(s) 243, FIG. 3A). In some embodiments, the at least one wire is an external wire of the sound-producing device. For example, the wire(s) 244 in FIG. 3A are external wires coupling the control circuitry 204 to the earpiece 245.

In some embodiments, the sound-producing device further includes a speaker (e.g., earpiece 245, FIG. 3A) coupled to the at least one wire. In some embodiments, the at least one wire is adapted to transmit electrical signals (e.g., audio signals 304, FIG. 3A) to the speaker, the electrical signals to be converted to sound by the speaker.

In some embodiments, the wireless power receiver is adapted to receive and convert the power waves (e.g., power waves 308, FIG. 3B) while the at least one wire is transmitting the electrical signals to the speaker. In some embodiments, the sound-producing device is a headphone, an earbud, a pair of headphones, a hearing aid, and/or a pair of earbuds. In some embodiments, the sound-producing device includes a wearable speaker.

In some embodiments, the electronic device is a mobile phone, a tablet computer, a laptop computer, a handheld electronic device, and/or a portable electronic device. In some embodiments, the sound-producing device is coupled to the electronic device via an audio port (e.g., a 3.5 mm headphone jack).

In some embodiments, the power waves comprise radio frequency signals (e.g., 915 MHz signals). In some embodiments, the power conversion circuitry is configured to convert energy from two or more types of power waves (e.g., power waves having different transmission characteristics, such as frequencies of 2.4 GHz and 5.8 GHz). In some embodiments, the two or more types include power waves having different intensities, such as a higher intensity for when the sound-producing device is not in use, or worn, by a user and a lower intensity for when the sound-producing device is in use or worn. Adaptive matching circuitry can be used to optimize the system for these operating modes; for example, the loading of these wire antennas will change significantly when is placed near a human body and, as such and in some embodiments, the adaptive matching circuitry may be used to tune operation for such operating modes (e.g., when the wires are placed near a human body). In some embodiments, the power conversion circuitry includes a rectifier and a power converter. In some embodiments, the power conversion circuitry is a component of an integrated wireless power receiving circuit or signal processing circuit (e.g., the power harvesting circuitry 120, 120-a, 120-b shown in the figures). In some embodiments, the integrated wireless power receiving circuit includes a controller configured to manage power conversion by the integrated wireless power receiving circuit. In some embodiments, the integrated wireless power receiving circuit includes a frequency matching circuit (e.g., matching circuitry 125, FIG. 1) adapted to match a frequency of the sound-producing device. In some embodiments, the integrated wireless power receiving circuit includes an impedance matching circuit (e.g., matching circuitry 125, FIG. 1) adapted to match an impedance of the sound-producing device.

In some embodiments, the power harvesting circuitry is configured to isolate or filter the power waves from other electrical signals travelling along the at least one wire. For example, power harvesting circuitry 120-b in FIG. 3B includes isolation circuitry 123-b for isolating the power signals 310 from the audio signals 304.

In some embodiments, the at least one wire includes a conductive shield and the power conversion circuitry is configured to receive the power waves via the conductive shield. In some embodiments, the at least one wire includes a wire enclosed in a non-conductive shield. In some embodiments, the at least one wire includes a hanging wire of the sound-producing device (e.g., a wire not used to convey audio signals).

In another aspect, a system for wireless power delivery includes: (1) a wireless power transmitter (e.g., transmitter 102a, FIG. 1) configured to transmit one or more power waves (e.g., waves 116, FIG. 1); and (2) a wireless power receiver remote from the wireless power transmitter, the wireless power receiver configured to: (a) receive the one or more power waves via at least one wire of a sound-producing device (e.g., wire 208 of sound-producing device 200, FIG. 2B); (b) convert energy from the received power waves to usable energy (e.g., via power harvesting circuitry 120, FIG. 2B); and (c) provide the usable energy to a power source of an electronic device (e.g., electronic device 122, FIG. 2B), the electronic device coupled to the sound-producing device.

In some embodiments, the wireless power transmitter is further configured to: (1) determine whether the sound-producing device is in use (e.g., based on an orientation or position of the sound-producing device, proximity to human body, or based on data signals received from the sound-producing device or a device, such as device 122, connected therewith); (2) transmit power waves having a first characteristic in accordance with a determination that the sound-producing device is in use; and (3) transmit power waves having a second characteristic in accordance with a determination that the sound-producing device is in use. For example, the power transmitter is configured to transmit power signals having lower relative intensity in accordance with a determination that the sound-producing device is in use and is configured to transmit power signals having a higher relative intensity in accordance with a determination that the sound-producing device is not in use. In some embodiments, the transmitter receives operating data from the sound-producing device (e.g., via signals 118, FIG. 1). For example, the sound-producing device transmits a particular signal only when in operation and the transmitter uses the presence or absence of the signal to determine whether the sound-producing device is in use.

In some embodiments, the wireless power receiver is configured to receive and convert energy from power waves having either the first characteristic or the second characteristic. For example, in accordance with some embodiments, power harvesting circuitry 120 in FIG. 2A is configured to receive and convert power signals having multiple intensities and/or multiple frequencies. In some embodiments, the wireless power transmitter is configured to adjust a characteristic of the power waves based on an orientation of the sound-producing device. For example, if the sound-producing device is in a horizontal orientation, the wireless transmitter determines that the sound-producing device is not in use by the user, whereas if the sound-producing device is in a vertical orientation, the transmitter determines that the sound-producing device is in use. In some embodiments, the transmitter receives orientation data from the sound-producing device (e.g., via signals 118, FIG. 1). As a second example, the antenna will see variable loading (due to proximity to the human body) when is being used, and therefore in some embodiments, can determine if the system is being used or not.

In some alternative embodiments, a repurposed wire is additionally or alternatively used to receive communication/data signals from remote devices. For example, the existing wire is used for the receipt of point-to-point communications (e.g., using BLUETOOTH protocols) and/or to receive broadband communications (e.g., using WI-FI protocols). In such embodiments, as will be appreciated by those skilled in the art, the power conversion circuitry 126 of FIG. 1 is replaced with the appropriate signal processing circuitry for processing the desired type of communication signals. As an example, a wire that couples a headset to a smart phone is repurposed so that, in addition to conveying audio signals from the smart phone to speakers in the headset, the wire is also used as an antenna to receive point-to-point communications that are processed and conveyed to the smart phone (e.g., for presentation to the user).

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 106 optionally includes one or more storage devices remotely located from the CPU(s) or processor(s) 104. Memory 106, or alternatively the non-volatile memory device(s) within memory 106, comprises a non-transitory computer readable storage medium.

Stored on any one of the machine readable medium (media), features of the present invention can be incorporated in software and/or firmware for controlling the hardware of a processing system (such as the components associated with the transmitters 102 and/or power harvesting circuitries 120), and for enabling a processing system to interact with other mechanisms utilizing the results of the present invention. Such software or firmware may include, but is not limited to, application code, device drivers, operating systems, and execution environments/containers.

Communication systems as referred to herein (e.g., communications component 112, FIG. 1) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZigBee, wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

The invention claimed is:

1. A hearing aid for utilizing wirelessly-delivered radio frequency (RF) power waves, the hearing aid comprising:
   a speaker configured to be coupled with a user's ear;
   sound-producing control circuitry configured to convert a first set of signals into audio signals that are converted into sound by the speaker;
   power-harvesting circuitry configured to convert a second set of signals into usable energy for powering the hearing aid, wherein the power-harvesting circuitry is coupled to the sound-producing control circuitry in such a way that the first set of signals passes through the power-harvesting circuitry before reaching the sound-producing control circuitry; and
   a wire coupled between the speaker and the sound-producing control circuitry, wherein:
      the wire is configured to receive the first and second sets of signals, wherein the second set of signals is RF power waves provided by a wireless power transmitter, and
      the wire is configured to convey the second set of signals to the power-harvesting circuitry.

2. The hearing aid of claim 1, wherein the power-harvesting circuitry is further configured to isolate the second set of signals from the first set of signals.

3. The hearing aid of claim 1, wherein the wire is an external wire of the hearing aid.

4. The hearing aid of claim 1, wherein:
   the wire includes a conductive shield adapted to receive the second set of signals; and
   the power-harvesting circuitry is configured to receive the second set of signals via the conductive shield.

5. The hearing aid of claim 1, wherein:
   the wire is further configured to:
      receive a third set of signals, wherein the third set of signals is RF power waves, and
      convey the third set of signals to the power-harvesting circuitry; and
   the power-harvesting circuitry is further configured to convert the third set of signals into usable energy for powering the hearing aid.

6. The hearing aid of claim 5, wherein:
   the wire is further configured to:
      receive a fourth set of signals, wherein the fourth set of signals is RF power waves, and
      convey the fourth set of signals to the power-harvesting circuitry; and
   the power-harvesting circuitry is further configured to convert the fourth set of signals into usable energy for powering the hearing aid.

7. The hearing aid of claim 6, wherein the second set of signals includes a frequency of 2.4 GigaHertz (GHz), the third set of signals includes a frequency of 5.8 GHz, and the fourth set of signals includes a frequency of 915 MegaHertz (MHz).

8. The hearing aid of claim 1, wherein the power-harvesting circuitry includes a rectifier and a power converter.

9. The hearing aid of claim 1, wherein the wire is further configured to secure the hearing aid to the user's ear.

10. The hearing aid of claim 1, wherein the wireless power transmitter is a far-field power transmitter or a near-field power transmitter.

11. The hearing aid of claim 1, wherein the second set of signals is transmitted in such a way that the second set of signals constructively interfere in proximity to the hearing aid.

12. The hearing aid of claim 1, wherein the wire operates as a monopole antenna.

13. The hearing aid of claim 1, further comprising a battery that is configured to be charged utilizing the usable energy converted by the power-harvesting circuitry.

14. A method of harvesting wireless power, the method comprising:
   at a hearing aid including (i) a speaker coupled with a user's ear, (ii) sound-producing control circuitry, (iii) power-harvesting circuitry coupled to the sound-producing control circuitry, and (iv) a wire coupled between the speaker and the sound-producing control circuitry:
      receiving a first set of signals and a second set of signals by the wire, wherein the second set of signals is radio frequency (RF) power waves provided by a wireless power transmitter;
      conveying, by the wire, the first set of signals to the sound-producing control circuitry, wherein the first set of signals pass through the power-harvesting circuitry before reaching the sound-producing control circuitry;
      converting, by the sound-producing control circuitry, the first set of signals into audio signals that are converted into sound by the speaker;
      conveying, by the wire, the second set of signals to the power-harvesting circuitry; and
      converting, by the power-harvesting circuitry, the second set of signals into usable energy for powering the hearing aid.

15. The method of claim 14, further comprising:
   receiving, by the wire, a third set of signals, wherein the third set of signals is RF power waves; and
   conveying, by the wire, the third set of signals to the power-harvesting circuitry; and
   converting, by the power-harvesting circuitry, the third set of signals into usable energy for powering the hearing aid.

16. The method of claim 15, further comprising:
   receiving, by the wire, a fourth set of signals, wherein the fourth set of signals is RF power waves;
   conveying, by the wire, the fourth set of signals to the power-harvesting circuitry; and
   converting, by the power-harvesting circuitry, the fourth set of signals into usable energy for powering the hearing aid.

17. The method of claim 16, wherein the second set of signals includes a frequency of 2.4 GigaHertz (GHz), the third set of signals includes a frequency of 5.8 GHz, and the fourth set of signals includes a frequency of 915 MegaHertz (MHz).

18. The method of claim 14, further comprising isolating the second set of signals from the first set of signals.

19. The method of claim 14, wherein the hearing aid includes a battery and the method further comprises:
   charging the battery utilizing the usable energy converted by the power-harvesting circuitry.

20. The method of claim 14, wherein the wireless power transmitter is a far-field power transmitter or a near-field power transmitter.

* * * * *